Patented Apr. 25, 1933

1,905,535

UNITED STATES PATENT OFFICE

JAMES F. WALSH, OF SOUTH ORANGE, AND AMERIGO F. CAPRIO, OF NEWARK, NEW JERSEY, ASSIGNORS TO CELLULOID CORPORATION, A CORPORATION OF NEW JERSEY

MODIFIER FOR CELLULOSE ACETATE PLASTICS

No Drawing. Application filed June 8, 1929. Serial No. 369,519.

This invention pertains to the general class of modifiers for cellulosic plastics and particularly to the class of plasticizers for cellulose acetate plastics.

As is well known in the art, thermo-plastic materials made with cellulose acetate, are inherently weak, particularly when compared with similar plastic material made with nitro cellulose. Many attempts have been made to overcome this lack of strength, among which is the selection of suitable plasticizers or modifiers. Many serious objections, however, have been raised to the plasticizers or modifiers heretofore employed. Many of these plasticizers or modifiers cannot be added in substantial amounts without causing a marked exudation or sweating out of such plasticizers or modifiers. This is particularly true if the material is subjected to heat or pressure, or to various climatic conditions. Some of the materials heretofore used are not strictly plasticizers, but are substantially nothing more than fire retarding agents. And while some others may be used in larger quantities without causing undue exudation, they nevertheless exhibit other serious objections, among which are a marked degree of solubility in water, a certain degree of volatility, and a tendency to hydrolize or break down in water, resulting in acidic products.

An object of this invention, therefore is to provide a plasticizer or modifier for cellulose acetate that may be employed in any desired quantities up to relatively large amounts, without causing exudation.

A further object of this invention is to provide a plasticizer or modifier for cellulose acetate having good plasticizing properties.

A further object of this invention is to provide a plasticizer or modifier for cellulose acetate that will result in increased flexibility, toughness, and a resistance to the separation of components in the finished product.

A further object of this invention is to provide a plasticizer or modifier for cellulose acetate that is substantially insoluble in water, that is substantially non-volatile, and that will not hydrolize or break down in water in any substantial amount.

A further object of this invention is to provide a modifier or plasticizer for cellulose acetate that is substantially neutral, substantially odorless, and substantially colorless, that is compatible with cellulose acetate, that is available commercially, and that is otherwise highly satisfactory for its intended purpose.

Many other objects and advantages will become apparent to persons skilled in the art as the specification proceeds.

In carrying out our invention, we employ as a plasticizer or a modifier for cellulose acetate, an ester of tartaric acid which is preferably of comparatively low volatility and is comparatively insoluble in water. Excellent results have been obtained by the use of dibutyl tartrate, and bibenzyl tartrate. Fair results have been obtained by the use of diethyl tartrate and dimethyl tartrate. However, the latter compounds exhibit a certain solubility in water, and for that reason are not preferred for this type of work. Monobenzyl tartrate exhibits good qualities.

These plasticizers or modifiers may be incorporated in cellulose acetate plastics in any desired amount. We have successfully incorporated amounts ranging from five to one hundred and twenty-five parts of plasticizer or modifier to one hundred parts of cellulose acetate.

We prefer to use dibutyl tartrate either in the normal or other form. Cellulose acetate plastics thus made, exhibit remarkable stability, flexibility, and marked resistance to separation of components, to discoloration, and to decomposition. The final product is practically odorless, and possesses a firm relatively hard, non-oily or non-sticky surface.

The ingredients may be mixed and processed by any of the means known in the art. Among these are mixing the cellulose acetate and the plasticizer or modifier in a kneader, together with a suitable solvent, such as acetone, ethyl lactate, ethyl methyl ketone, etc. or any of the known combinations of ethyl alcohol, methyl alcohol, acetone, chloroform, benzol, amyl acetate, ethyl lactate, ethyl methyl and/or other more or less volatile liquid as found most effective for the results desired. The material may then be taken to the rolls after a suitable evaporation of solvent, and after suitable working may be formed into sheets. These sheets are then stacked and formed into blocks by heat and pressure. Sheets may then be cut from these blocks. These sheets are finally polished between metal plates by means of heat and pressure.

Another method of forming the cellulose acetate plastic is by adding sufficient solvent to form a flowable dope which is placed in the hopper of an ordinary film casting apparatus. The film thus cast may be used for photographic or other purposes or may be cut into suitable lengths and the lengths stacked and formed into blocks. In the latter case the blocks are sheeted and the sheets finished as above set forth. Or the lengths may be sent to the rolls, and after suitable working, formed into sheets. These sheets are stacked and formed into blocks by means of heat and pressure, and the blocks are sheeted and the sheets polished as previously set forth.

The material coming from the kneader or from the film casting apparatus or from the rolls may be fed to an extrusion machine and formed into sheets, rods, tubes or other forms by means of extrusion through a die.

The blocks, sheets, rods, tubes, films and other forms thus made, may be employed in the manufacture of articles without limit. For instance, they may be used in making lacquers, dopes, toilet articles, fountain pens, toys, molding compositions, etc., etc.

A few suitable formulæ are listed herein. However, it is understood that the invention is not limited to the formulæ given:

*Formula (a)*

| | Parts |
|---|---|
| Cellulose acetate | 100 |
| Triphenyl phosphate | 20 |
| Dibutyl tartrate | 10 |

*Formula (b)*

| | Parts |
|---|---|
| Cellulose acetate | 100 |
| Dibutyl tartrate | 25 to 125 |

*Formula (c)*

| | Parts |
|---|---|
| Cellulose acetate | 100 |
| Tricresyl phosphate | 12 |
| Paraethyltoluenesulphonamid | 28 |
| Benzyl tartrate | 5 |

*Formula (d)*

| | Parts |
|---|---|
| Cellulose acetate | 100 |
| Triphenyl phosphate | 25 |
| Dibutyl tartrate | 5 |

It is of course understood that the above ingredients are preferably mixed and colloided by the aid of suitable solvents to make either a flowable dope for film casting purposes, or a plastic mass. Pigments and/or other coloring matter may be added as desired, with or without filling materials. Examples of such pigments or filling materials are gypsum, talc, mica, barytes, clay, titanium oxide, iron oxide, etc. Other fillers include cork, leather, rubber, cotton waste, wood flour, gum, etc., either in granulated, pulverized or other form.

While the use of dibutyl tartrate is preferred, it is of course understood that other tartrate esters of either the aliphatic or aromatic groups may be employed. Of the other esters of tartaric acid thus employed, those of comparatively low volatility and comparatively insolubility in water are preferred. However, others may be employed as above noted.

Having described our invention, it is understood that the particular description is given merely by way of illustration, and that many variations may be made in the same within the scope of the claim, without departing from the spirit of the invention.

We claim:

A firm, relatively hard composition comprising cellulose acetate, triphenyl phosphate and dibutyl tartrate in the proportion of 100 parts of cellulose acetate, 20 to 25 parts of triphenyl phosphate and 5 to 10 parts of dibutyl tartrate.

In testimony whereof, we have hereunto subscribed our names.

JAMES F. WALSH.
AMERIGO F. CAPRIO.

CERTIFICATE OF CORRECTION.

Patent No. 1,905,535. April 25, 1933.

JAMES F. WALSH, ET AL.

It is hereby certified that error appears in the printed specification of the above numbered patent requiring correction as follows: Page 1, line 70, for "bibenzyl" read "dibenzyl"; page 2, line 1, after "methyl" insert the word "ketone"; and that the said Letters Patent should be read with these corrections therein that the same may conform to the record of the case in the Patent Office.

Signed and sealed this 23rd day of May, A. D. 1933.

(Seal) M. J. Moore
Acting Commissioner of Patents.